United States Patent [19]
Murphy

[11] Patent Number: 5,518,099
[45] Date of Patent: *May 21, 1996

[54] FRICTION CLUTCH DRIVEN PLATES

[75] Inventor: Robert J. Murphy, Gwent, Great Britain

[73] Assignee: Automotive Products, plc, Leamington Spa, England

[*] Notice: The term of this patent shall not extend beyond the expiration date of Pat. No. 5,257,687.

[21] Appl. No.: 162,024

[22] PCT Filed: May 13, 1992

[86] PCT No.: PCT/GB92/00861

§ 371 Date: Dec. 3, 1994

§ 102(e) Date: Dec. 3, 1994

[87] PCT Pub. No.: WO92/22754

PCT Pub. Date: Dec. 23, 1992

[30] Foreign Application Priority Data

Jun. 12, 1991 [GB] United Kingdom .................. 9112598

[51] Int. Cl.$^6$ ..................................................... F16D 3/14
[52] U.S. Cl. ............... 192/207; 192/213.12; 192/213.31; 192/214.1

[58] Field of Search ............... 192/106.1, 106.2, 192/107 R, 70.17, 207, 210.1, 212, 213.12, 213.31, 214.1; 464/68

[56] References Cited

U.S. PATENT DOCUMENTS

| | | | |
|---|---|---|---|
| 1,862,991 | 6/1932 | Vargha | 192/106.1 |
| 1,896,914 | 2/1933 | Paton | 192/106.2 |
| 1,931,065 | 10/1933 | Drude | 192/106.2 X |
| 4,821,860 | 4/1989 | Crawford et al. | 192/107 C |
| 4,892,177 | 1/1990 | Lanzarini et al. | 192/106.2 |
| 5,059,155 | 10/1991 | Tojima | 192/106.2 X |
| 5,257,687 | 11/1993 | Cooke | 192/106.2 |

*Primary Examiner*—Richard M. Lorence
*Attorney, Agent, or Firm*—Paul E. Milliken; Lee A. Germain

[57] ABSTRACT

A friction clutch drive plate having a hub and friction facings which face in opposite directions, the friction facings each being mounted on a respective coaxial carrier plate. At least one, and preferably both of the carrier plates is rotatable about the hub, the two carrier plates being secured back to back with each other and being rotatable realative to each other, said rotation being opposed by friction damping means which may comprise the two carrier plates biased against each other so that adjacent surfaces of the two plates are in frictional engagement.

13 Claims, 6 Drawing Sheets

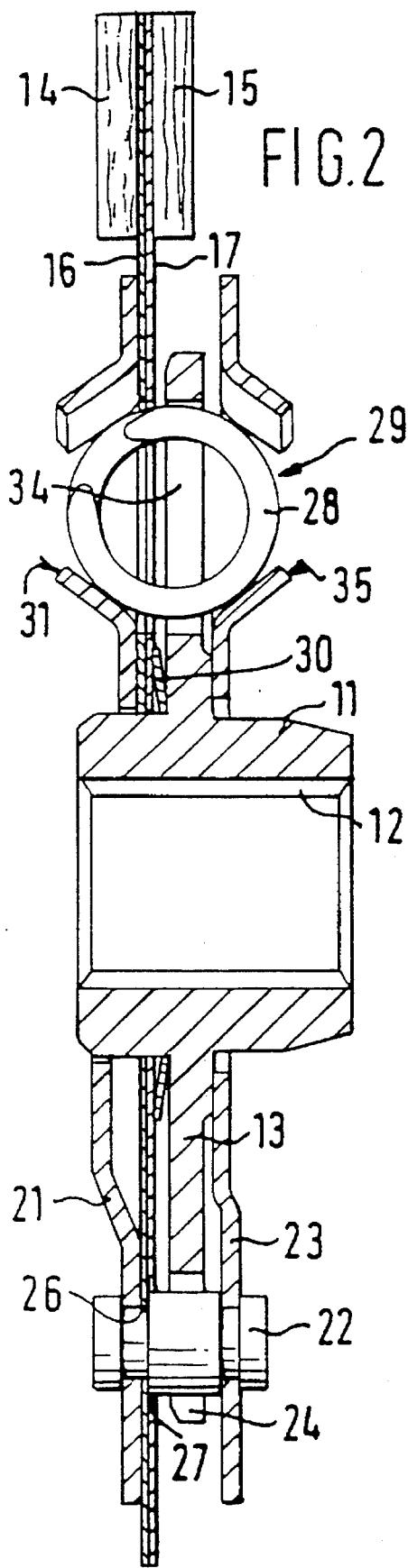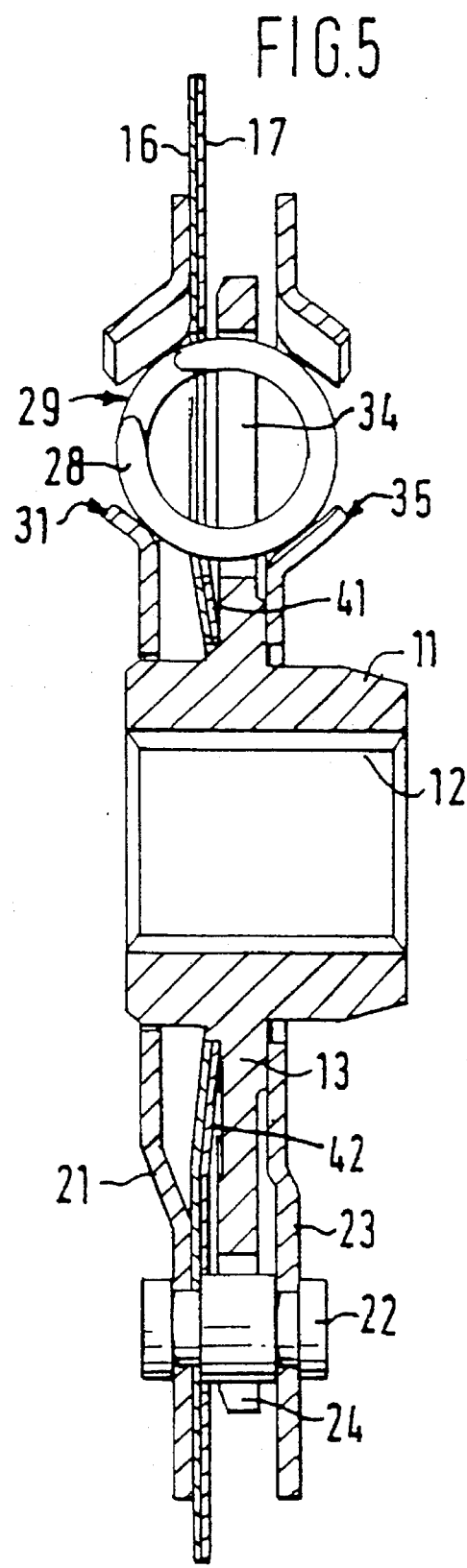

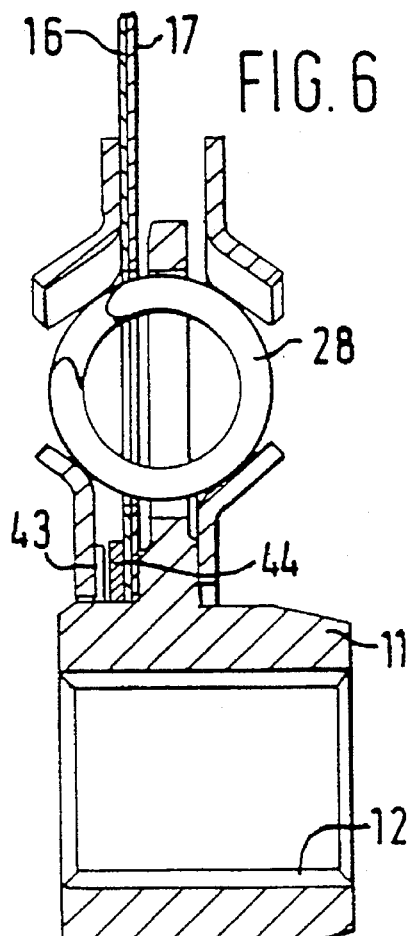
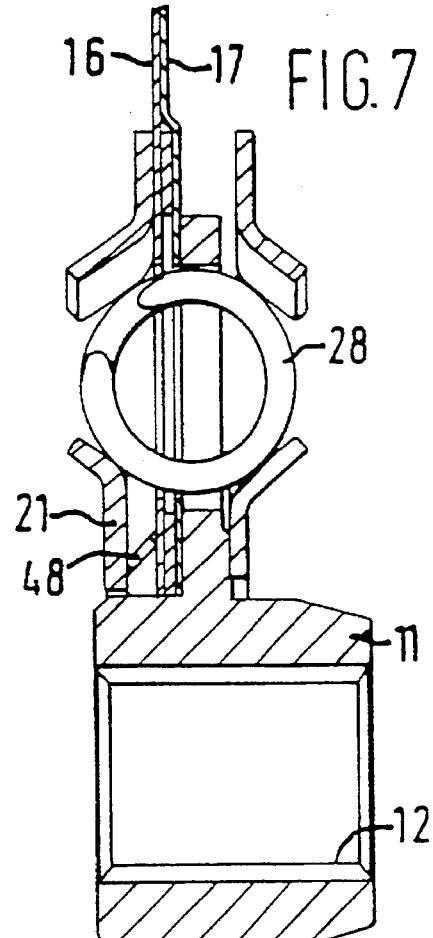
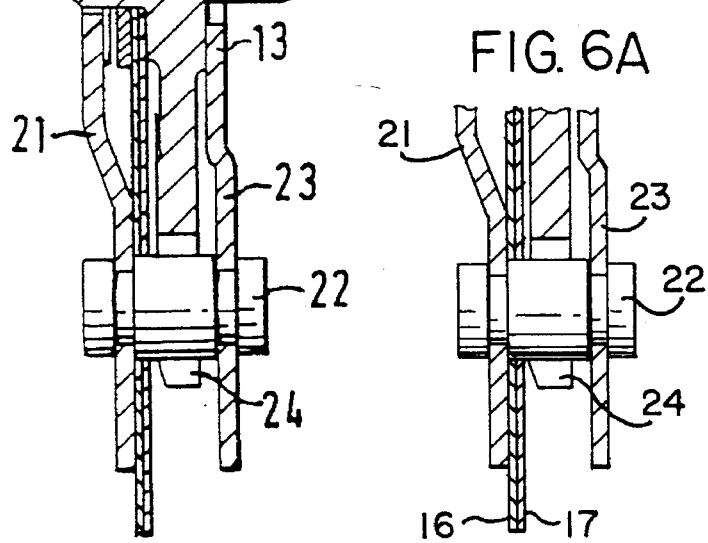
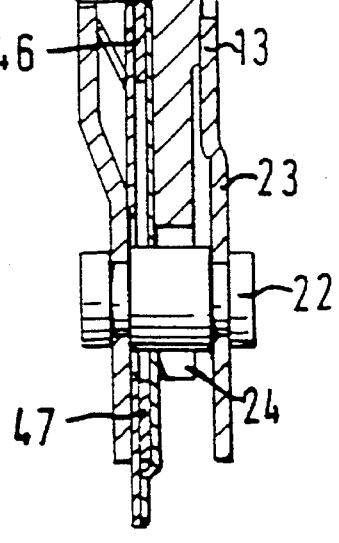
FIG. 6  FIG. 6A  FIG. 7

5,518,099

FRICTION CLUTCH DRIVEN PLATES

This invention relates to friction clutch driven plates for vehicles and in particular to friction clutch driven plates for cars.

A typical motor vehicle engine is connected to the vehicle gear box through a friction clutch which includes a pressure plate and flywheel connected to the engine, and a clutch driven plate sandwiched therebetween which is connected to the vehicle gear box.

In order to smooth out the clutch engagement on take up of the drive from the engine, the clutch driven plate generally has some axial cushioning between its opposed friction facings, and a torsion damping means between the friction facings which engage the engine, and the driven plate hub which is connected to the gear box.

In our application PCT/GB91/00001 we have described a friction clutch driven plate having a hub and friction facings which face in opposite directions, the friction facings for each direction are mounted on a respective coaxial annular carrier plate, at least one of the carrier plates being rotatable about the hub, the two carrier plates being secured back to back with each other such that one carrier plate can rotate relative to the other carrier plate. Such a driven plate will be called a driven plate of the type referred.

According to the present invention there is provided a driven plate of the type referred in which friction damping means act to resist said rotation.

Such a driven plate prevents clutch judder and gives an improved clutch take up.

Preferably, the two carrier plates are secured together by fastening means passing through aligned holes in the two carrier plates, said holes in at least one carrier plate being enlarged relative to the fastening means to enable said one carrier plate to move rotationally relative to the other carrier plate, and conveniently the two carrier plates are in frictional engagement one with the other.

Preferably the radially inner portions of the carrier plates are shaped to act as belleville springs with at least one carrier plate biased against the other carrier plate.

Alternatively the hub has a radially outwardly extending flange, and the two carrier plates are secured to a disc adaptor arranged on one axial side of the hub flange, and the disc adaptor is secured to a retainer plate on the other axial side of the flange, said fastening means extending axially through co-operating apertures in the hub flange which allow the disc adaptor and retainer plate to move rotationally about the hub, the two carrier plates, being located axially between the hub flange and the disc adaptor, and resilient means located around each fastening means act to bias the carrier-plates together.

Preferably the resilient means are belleville springs with at least one spring locating coaxially with each fastening means, and preferably each belleville spring acts between the retainer plate and disc adaptor through a sleeve slidable on the fastening means.

Alternatively the friction damping means includes a friction washer fast with the hub which engages a surface on said one carrier.

Preferably said relative rotation is also resisted by resilient means acting between the two carrier plates.

The invention will be described by way of example and with reference to the accompanying drawings in which:

FIG. 2 is a section on the line II—II of FIG. 1;

FIGS. 5, 6, 6A and 7 are sections or partial sections similar to FIG. 2 showing alternative friction damping means;

Figure 1:
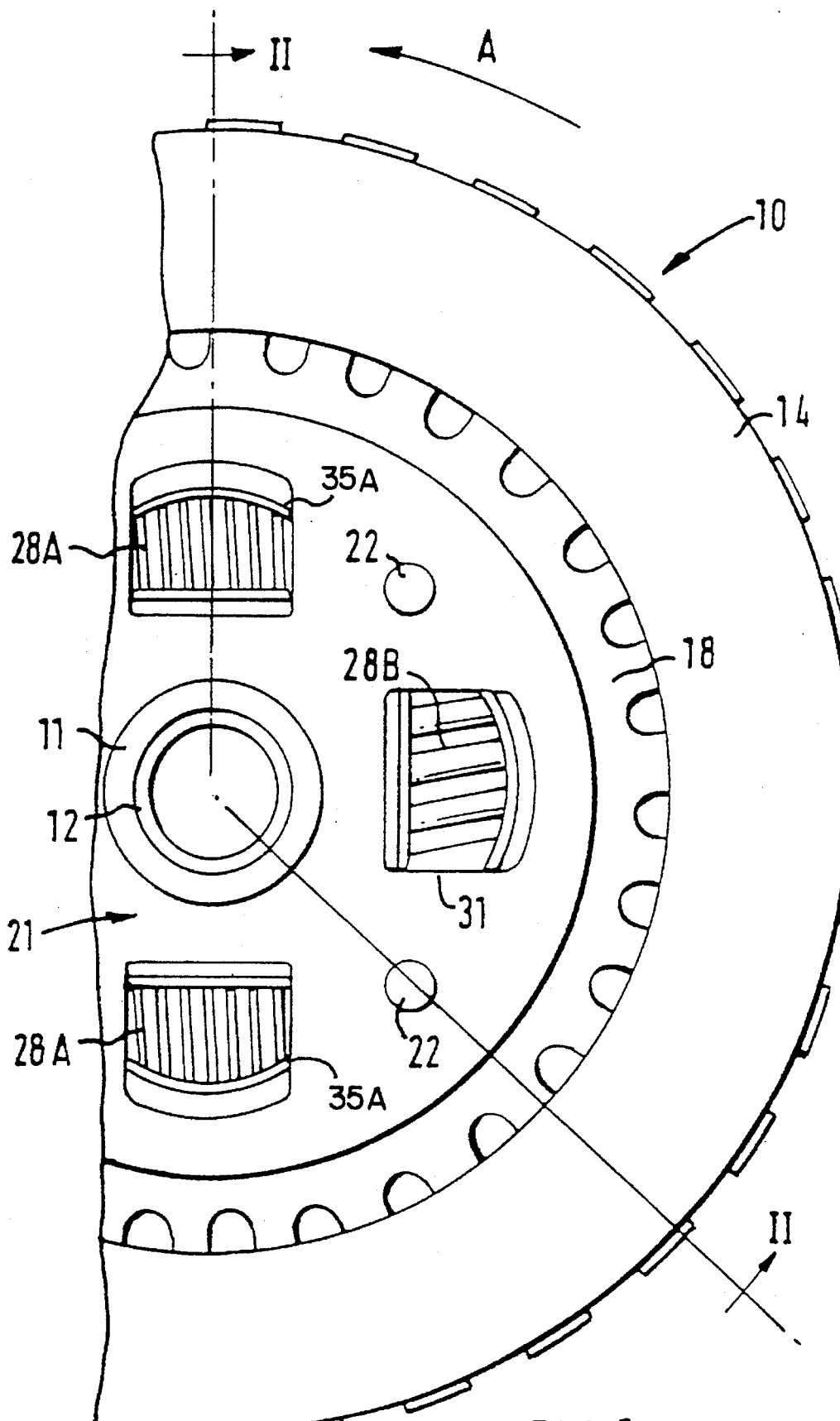
FIG. 1 is an elevation of a friction clutch driven plate according to the invention.
Figure 3:
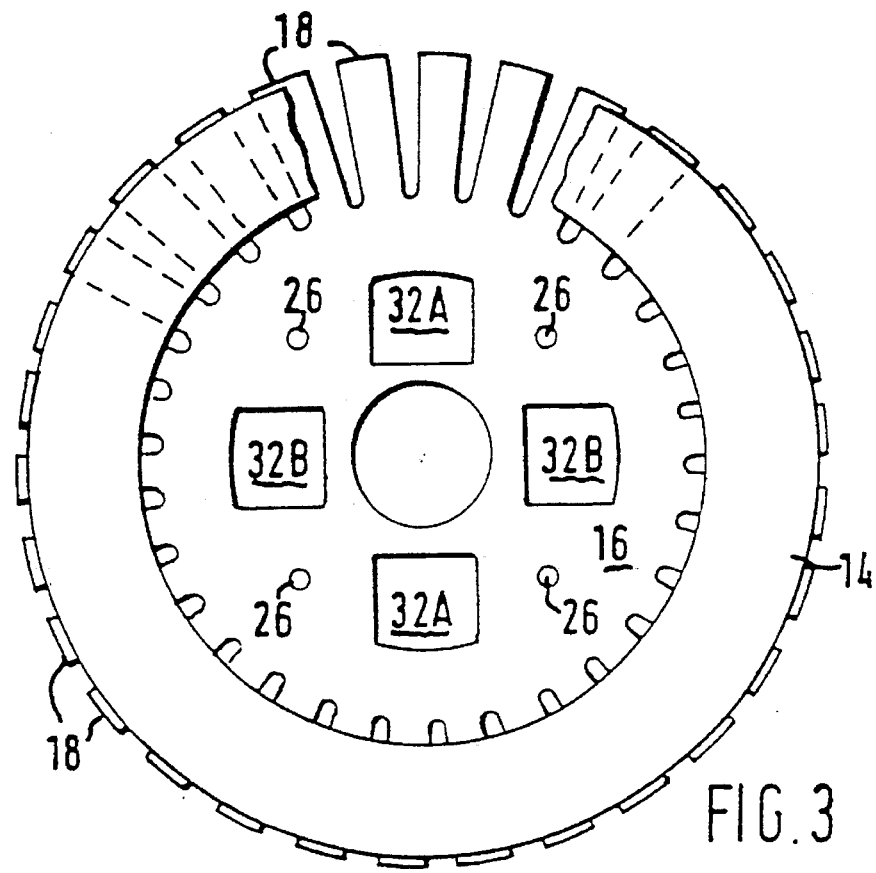
FIG. 3 is an elevation of the fixed carrier plate of the driven plate of FIG. 1.
Figure 4:
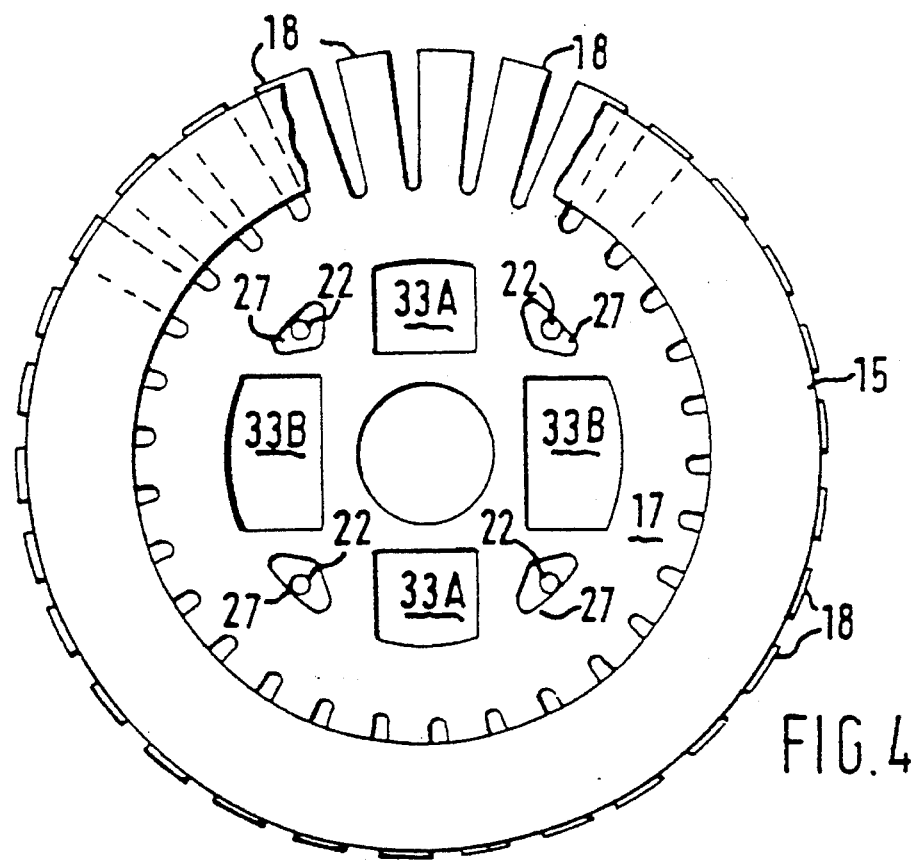
FIG. 4 is an elevation of the movable carrier plate of the driven plate of FIG. 1.

With reference to FIGS. 1 to 4 of the accompanying drawing, the illustrated friction clutch driven plate is comprises a hub 11 having internal splines 12 for connection with a gear box input shaft (not shown) and a radially outwardly extending annular flange 13.

A pair of annular friction facings 14 and 15 are each mounted on an annular carrier plate 16 and 17 respectively. Each carrier plate 16 and 17 is an annular plate having a plurality of circumferentially, spaced radially extending fingers 18 projecting outwardly from its outer periphery.

The facings 14 and 15 are secured to the fingers 18 of the respective carrier plate 16 or 17 by any suitable means e.g. rivets, integral rivets, tabs, adhesives. It has been found that silicone rubber adhesive which is laid onto the back face of the facing 14 or 15 in concentric circles, or spiral turns, is particularly suitable. The reader is directed to EP252583, EP323036, and WO 89/05411 for a more detailed description of the adhesion of facings to a carrier plate of the present type using silicone rubber adhesives. In particular it is advantageous to use a silicone rubber adhesive for the facing 15 in use adjacent the clutch pressure plate and a conventional rigid adhesive in use adjacent the flywheel.

The carrier plates 16 and 17 are flat steel plates that are arranged back to back with the facings 14 and 15 directed in opposite directions for engagement in use with a flywheel and pressure plate. The two carrier plates 16 and 17 are located on one axial side of the hub flange 13 and are secured to a disc adaptor 21 located axially outwardly of the carrier plates 16 and 17 by four equiangularly spaced rivets or stop pins 22. The stop pins 22 also serve to secure the disc adaptor 21 to a retainer plate 23 located on the other axial side of the hub flange 13. The stop pins 22 pass through co-operating apertures 24 in the outer peripheral margin of the hub flange 13 so that the carrier assembly comprising the carrier plates 16, 17, disc adaptor 21, and retainer plate 23, can rotate relative to the hub 11.

The relative rotation is limited by abutment of the stop pins 22 with the radial ends of the apertures 24. The entire carrier assembly may be mounted to facilitate rotation on a bush (not shown) located between the hub 11 and the retainer plate 23, or disc adaptor 21.

The two carrier plates 16 and 17 are arranged so that one carrier plate 16 which in use is adjacent the flywheel is fixed rotationally fast with the disc adaptor 21 by the stop pins 22 closely engaging in holes 26 in the plate 16, whereas the second carrier plate 17 in use adjacent the pressure plate is capable of limited angular rotation relative to the first carrier plate 16. This rotation is allowed by the pins 22 being accommodated by circumferentially elongated holes 27 in the plate 17, which allow for approximately 5 degrees of movement between the two carrier plates 16 and 17 in either direction of rotation, and for rotation of the second carrier plate 17 relative to the hub 11. Alternatively the carrier plates 16 and 17 may be arranged for relative rotation in one direction only.

This arrangement could be reversed, as showing in FIGS. 6 and 7 with the carrier plate 17 adjacent the hub flange 13 fixed on the stop pins 22 and the carrier plate 16 adjacent the disc adaptor 21 having the elongated holes therein to allow it to move around the hub.

The carrier plate 17 in use is adjacent the pressure plate and the carrier plate 16 in use is adjacent the flywheel.

In yet a further embodiment, both carrier plates could have elongated apertures therein allowing each plate some limited circumferential movement. Again the relative movement could be in one direction only relative to each other and relative to the driven plate centre.

The relative rotation of the friction facings 14 and 15 relative to the hub 11 is also resisted by resilient means, preferably springs 28, housed in aligned sets of apertures 29, known as spring windows, in the hub flange 13, carrier plates 16 and 17, disc adaptor 21, and retainer plate 23. In the present embodiment there are four springs 28 housed in four sets of apertures 29 but other number of springs could be used, e.g. three to eight springs.

Each set of apertures 29 comprises a disc adaptor spring window 31, a fixed carrier plate spring window 32A, 32B a movable carrier plate spring window 33A, 33B, a hub flange spring window 34, and retainer plate spring window 35.

The springs 28 comprises two diametrically opposed light torsion damping springs 28A and two diametrically opposed main torsion damping springs 28B act to resist relative rotation initially between the two carrier plates 16 and 17, and thereafter between the carrier assembly and the hub 11.

The main torsion damping springs 28B act to resist relative rotation between the carrier assembly and the hub 11.

A belleville washer 30 located between the hub flange 13 and the carrier plate 17 biases the radially inner margins of the two carrier plates 16 and 17 into frictional engagement. This provides some friction damping acting to resist relative rotation between two carrier plates 16 and 17. The plates 16 and 17 can be steel on steel or can be coated by for example phosphating, or can have different frictional coefficients.

The operation of the friction clutch driven plate will now be described with the hub held stationary and a torque load applied to the friction facings to rotate the facings in the direction of arrow 'A' as shown in FIG. 1.

During the take up of the clutch, as the friction facings begin to frictionally engage between the pressure plate and the flywheel under the clamp load of a spring, the friction facing 105 adjacent to the pressure plate will normally engage first fractionally before the other facing engages with the flywheel.

As the friction facing 15 engages the pressure plate, the torsion load will rotate the movable carrier plate 17 relative to the fixed carrier plate 16 which is held stationary relative to the hub 11 by the main torsion springs 28B engaging in the fixed carrier plate spring windows 32B. As the carrier plate 17 is rotated the light springs 28A are compressed between opposed radial faces in the spring windows 31A, 32A and 35A, in the fixed carrier plate 17, the disc adaptor 21, and retainer plate 23, on the one hand, and the opposed radial face in the movable carrier plate spring window 33A.

Simultaneously, the clearance in the spring window 33B around the main torsion damping springs 28B, allows the moveable carrier plate 17 to rotate without interference from the main spring 28B until, the clearance has been taken up.

When the clearance has been taken up the movable carrier plate 17 engages the stop pins 22 through the ends of the apertures 27 and the relative position between the two carrier plates is then fixed, so that any further rotational movement of the facing 15 will also cause the carrier plate 16 to rotate and both plates will move together with further compression of the light spring 28A until the light spring 28A abuts the end of its respective hub flange window 34A.

The degree of rotation at which spring 28A comes against the end of hub flange window 34A may coincide with the abutment of the moveable carrier plate window 33B against the main torsion damping springs 28B, and the abutment of the stop spring 22 against the ends of the apertures 27.

However the various clearances can be altered as is desired to achieve a required torque verses relative rotation curve.

Once the two carrier plates 16 and 17 are rotationally fixed, either by the abutment of the stop pins 22 against the ends of the apertures 27, or by the application of a sudden and large spring clamp load, then further rotation of the carrier assembly around the hub is resisted by all the springs 28 in the well known manner.

With reference to FIG. 5, the driven plate is identical with that shown in FIGS. 1–4, except that radially inner portions 41, 42 of the two carrier plates 16 and 17 are formed as belleville springs sections and bias against each other to create the frictional engagement between the two carrier plates 16 and 17. The belleville portion 42 of the rotary plate 17 reacts against the hub flange 13 to bias itself against the other carrier plate 16.

With reference to FIG. 6, the carrier plate 17 is in frictional engagement with the hub flange 13, and is biased against the hub flange 13 by a spring washer 43, preferably a wavy washer acting between the disc adaptor 21 and a friction washer 44 adjacent the carrier plate 16. The friction washer 44 is rotationally fast with the hub 11 or the disc adaptor 21, so that the initial movement of the carrier plate 16 which is relative to both hub 11 and the disc adaptor 21 is resisted by friction engagement between the friction washer 44 and the carrier plate 16, and also by the frictional engagement between the two carrier plates 16 and 17.

The embodiment in FIG. 6A is similar to the embodiment shown in FIG. 6 except that both carrier plates 16 and 17 have enlarged holes therein relative to the stop pins 22.

With reference to FIG. 7, the embodiment is similar to that shown in FIG. 6, excepting that there are two concentric friction damping washers 46, 47 located between the carrier plate 16 and 17. The fixed carrier plate 17 is dished to accommodate the two washers, one washer 46 being adjacent the hub 11, and the other washer 47 being radially outside the stop pin 22. A belleville spring 48 acts between the disc adaptor 21 and the movable carrier plate 16 to bias the carrier plate 16 against the friction washer 46. The friction washers 46 and 47 are fixed to the fixed carrier plate.

Figure 8:
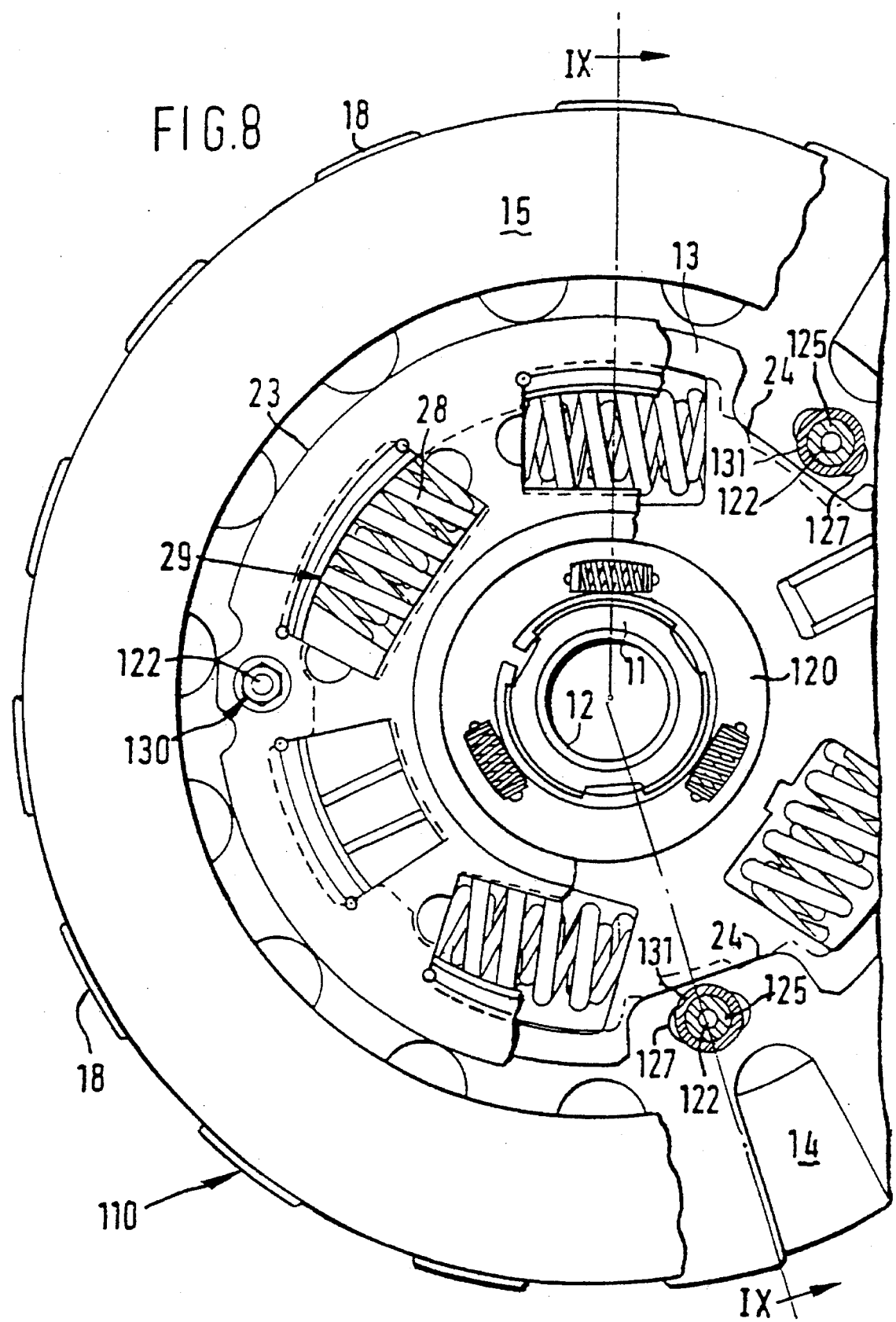
FIG. 8 is an elevation of a further embodiment of a friction clutch driven plate according to the invention.
Figure 9:
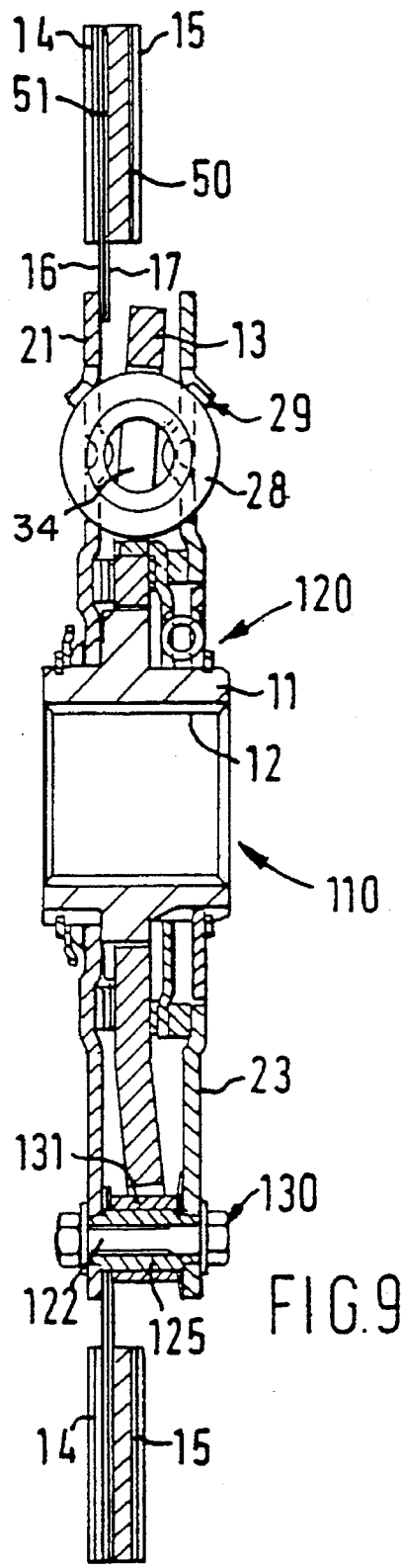
FIG. 9 is a section on the IX—IX of FIG. 8.
Figure 10:
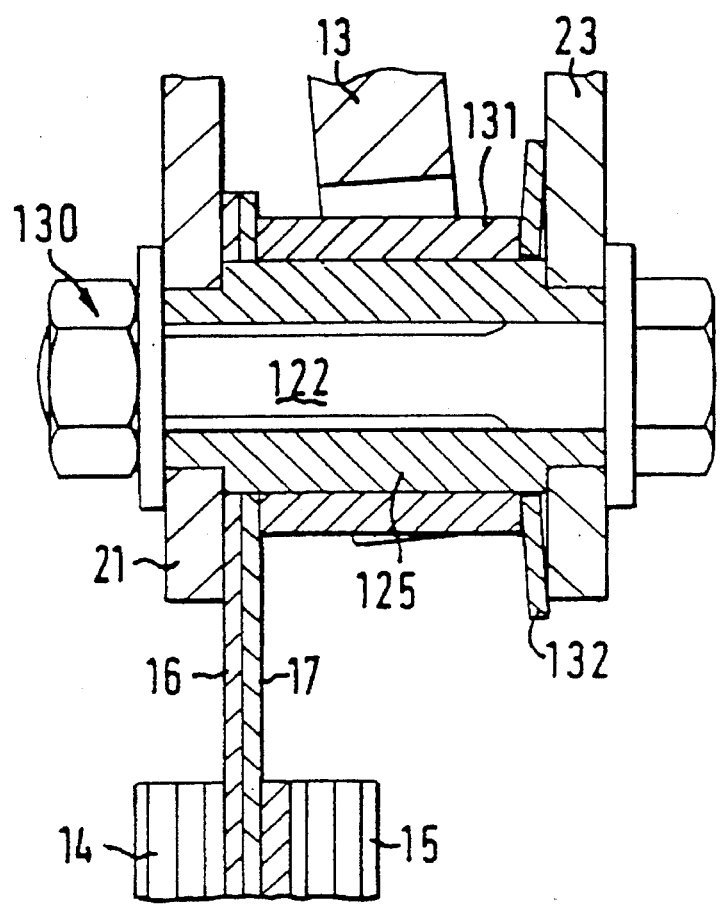
FIG. 10 is an enlargement of the fastening means and resilient means shown in FIG. 8.

Now with reference to FIGS. 8 to 10 of the accompanying drawing, there is illustrated yet another friction clutch driven plate 110 according to the invention.

Those components of the driven plate 110 which are similar to those described with reference to FIGS. 1–4 will be given the same reference numbers, and only the difference will be described.

The flange 13 may be fixed relative to the hub as is shown in FIGS. 1 to 7, or may be capable of limited angular movement about the hub 11. (As shown). The movement between the hub flange 13 and the hub is retained by a first stage damping means 120. The operation of the first stage damping means 120 is described in detail in EP0414360.

The stop pin assemblies 122 may be in the form of stepped rivets but in this case are shown as threaded set screws and nuts 130, within a surrounding spacer sleeve 125. The stop pin assemblies 122 also serve to secure the disc adaptor 21 to the retainer plate 23 located on the other axial side of the hub flange 13. The rotation of the carrier assembly 16,17,21,23 rotation relative to the hub flange 13 is limited by abutment of the stop pin assemblies 122 with the radial ends of the apertures 24. Both carrier plates 16 and 17 are capable of limited angular rotation relative to each other and relative to the stop pins 122. The stop pins 122 each pass through the spacer sleeve 125 which acts to space the adaptor disc 21 from the retainer plate 23. The rotation is allowed by the stop pin assemblies 122 being accomodated by circumferentially elongated holes 127 in the plates 16 and 17, which allow for approximately 5 degrees of movement between the two carrier plates 16 and 17 in either direction of rotation, and for rotation of the carrier plates 16 or 17 is fixed on the stop pin assemblies 122 and the other carrier plate has the elongated holes therein to allow it to move around the hub.

Each stop pin assembly 122 is surrounded by a hollow cylindrical sleeve 131 which is free to move axially on the spacer 125. The sleeve 131 is biased against the carrier plate 17 by a belleville washer 132 reacting against the retainer plate 23. The bias of the belleville washer holds the two plates 16 and 17 together and creates a friction engagement therebetween.

The relative rotation of the friction facings 14 and 15 relative to the hub 11 is resisted by main torsion damping means 28 either helical springs or rubber springs housed in aligned sets of spring windows 29, and by the first stage damping means 120.

In an alternative construction (not shown) the belleville washer 132 could be located at the other end of the sleeve 31 to act directly against the carrier plate 17.

The length of the sleeve 25 could be made adjustable by a screw threaded means in order to provide a menu for setting the friction damping to a required level, for different vehicles by varying the load in belleville spring(s).

In yet another embodiment the sleeve and belleville washer could be replaced by a helical spring.

The number of belleville washers could be greater than one as is required for a desired spring load.

I claim:

1. A single plate friction clutch driven plate having a hub carrying first and second coaxial carrier plates with respective first and second oppositely facing friction facings mounted thereon, both of the carrier plates being operatively connected for limited rotation relative to the hub and to each other and being secured back to back with each other with respective first and second friction damping surfaces on the carrier plates biased into contact with each other by a resilient means carried on the friction driven plate to generate friction damping by contact between the first and second friction damping surfaces to resist relative rotation of the first and second friction facings.

2. A friction clutch driven plate as claimed in claim 1 wherein the first and second friction damping surfaces are formed on the first and second carrier plates respectively.

3. A friction clutch driven plate as claimed in claim 1 wherein the radially inner portions of the two carrier plates are formed as belleville spring sections and bias said first and second friction damping surfaces against each other.

4. A friction clutch driven plate as claimed in claim 1 wherein the two carrier plates are secured back to back with each other by fastening means passing through aligned holes in the two carrier plates, said holes on at least the first carrier plate being enlarged relative to the fastening means to enable said first carrier plate to move relative to the second carrier plate.

5. A friction clutch driven plate as claimed in claim 4 wherein both carrier plates have enlarged holes therein relative to said fastening means.

6. A friction clutch driven plate as claimed in claim 4 in which the hub has a radially outwardly extending flange and the two carrier plates are located on one axial side of the flange, the carrier plates being located between the flange and a disc adaptor on said one axial side of the flange, and the carrier plate adjacent the disc adaptor is fixed thereto and said other carrier plate having the enlarged holes therein is adjacent the hub flange, and the resilient means acts between the hub flange and said other carrier plate.

7. A friction clutch driven plate as claimed in claim 4 wherein the hub has a radially outwardly extending flange, and the two carrier plates are secured to a disc adaptor arranged on one axial side of the hub flange, and the disc adaptor is secured by fastening means to a retainer plate on the other axial side of the flange, said fastening means extending axially though co-operating apertures in the hub flange which allow the disc adaptor and retainer plate to move rotationally about the hub, the two carrier plates being located axially between the hub flange and the disc adaptor, and resilient means located around each fastening means act to bias the carrier plates together.

8. A friction clutch driven plate as claimed in claim 7 wherein the resilient means are belleville springs with at least one spring locating coaxially with each fastening means.

9. A friction clutch driven plate as claimed in claim 8 wherein each belleville spring acts between the retainer plate and the disc adaptor through a sleeve slidable on the fastening means.

10. A friction clutch driven plate as claimed in claim 7 wherein a friction engaging device is biased against the carrier plate having the enlarged holes therein.

11. A friction clutch plate as claimed in claim 10 wherein the friction engaging device is located between a disc adaptor and the first carrier plate having the enlarged holes therein and is biased against said first carrier plate by a spring washer acting against the disc adaptor.

12. A friction clutch driven plate according to claim 1 wherein the first or second friction damping surface is formed on a friction engaging means secured by a securing means to the first or second carrier plate respectively.

13. A friction clutch driven plate as claimed in claim 12 wherein there are two concentric friction engaging means which are accommodated in and secured by a securing means to a dished portion of one carrier plate and frictionally engage with the other relatively moveable carrier plate.

\* \* \* \* \*